(12) United States Patent
Goshen et al.

(10) Patent No.: US 9,077,703 B1
(45) Date of Patent: Jul. 7, 2015

(54) SYSTEMS AND METHODS FOR PROTECTING USER ACCOUNTS

(71) Applicant: Symantec Corporation, Mountain View, CA (US)

(72) Inventors: Samuel Goshen, Brighton, NY (US); Scott Douglass, Penfield, NY (US)

(73) Assignee: Symantec Corporation, Mountain View, CA (US)

( * ) Notice: Subject to any disclaimer, the term of this patent is extended or adjusted under 35 U.S.C. 154(b) by 99 days.

(21) Appl. No.: 13/938,615

(22) Filed: Jul. 10, 2013

(51) Int. Cl.
*G06F 7/04* (2006.01)
*H04L 29/06* (2006.01)

(52) U.S. Cl.
CPC .......................................... *H04L 63/08* (2013.01)

(58) Field of Classification Search
CPC ........................................................ H04L 63/08
USPC ........................................ 726/7, 2, 5, 18, 29
See application file for complete search history.

(56) References Cited

U.S. PATENT DOCUMENTS

| 8,490,162 | B1 * | 7/2013 | Popoveniuc et al. | 726/5 |
| 2003/0074585 | A1 * | 4/2003 | Charbonneau | 713/202 |
| 2009/0210938 | A1 * | 8/2009 | Childress et al. | 726/18 |
| 2014/0123257 | A1 * | 5/2014 | Gordon et al. | 726/7 |

\* cited by examiner

*Primary Examiner* — Brian Shaw
(74) *Attorney, Agent, or Firm* — ALG Intellectual Property, LLC (57) ABSTRACT

A computer-implemented for protecting user accounts may include: 1) identifying a credential that a computing device uses to log in to a user account of an online system, where the online system is configured to perform an adverse security action in response to a number of failed attempts to log in to the user account, 2) determining that an old version of the credential is no longer valid for logging in to the user account and that a new version of the credential is required to log in to the user account, and 3) taking a remedial action that prevents the adverse security action in response to determining that the old version of the credential is no longer valid. Various other methods, systems, and computer-readable media are also disclosed.

19 Claims, 7 Drawing Sheets

SYSTEMS AND METHODS FOR PROTECTING USER ACCOUNTS

BACKGROUND

Users that maintain accounts with online systems, such as corporate email systems, often synchronize their data between a variety of devices, such as mobile devices and desktop or laptop computers. Additionally, IT administrators typically implement security policies to maintain the security of such user accounts. For example, administrators of a network directory service, such as MICROSOFT's ACTIVE DIRECTORY, may require users to change their account credentials (e.g., passwords) at a fixed interval (e.g., every 30 to 90 days).

Computing devices synchronized with user accounts often automatically store and use credentials to log in to such user accounts. Unfortunately, when a security policy requires a user to change their credentials, the user's computing device may nevertheless persist in attempting to log in with outdated credentials stored on the computing device, potentially resulting in repeated failed attempts to log in. After a number of failed attempts, the online system may take an adverse security action against the computing device, such as wiping the device or locking out the user.

For example, a computing device may attempt to retrieve email, or other information, often enough such that, if an employee changed their network directory service credentials before leaving work, the computing device may fail three or four authentication attempts by the time the employee arrives home. In that case, if the employee's company had a policy of wiping devices after three failed authentication attempts, the employee's computing device may be wiped without even giving the user a chance to take action to correct the issue. As such, the instant disclosure identifies a need for improved systems and methods for protecting user accounts.

SUMMARY

As will be described in greater detail below, the instant disclosure generally relates to improved systems and methods for protecting user accounts by determining when a user has been required to change a password or credential and then preventing an adverse response to a failed login attempt that uses an old version of the credential. In one example, a computer-implemented method for performing such a task may include (1) identifying a credential that a computing device uses to log in to a user account of an online system that is configured to perform an adverse security action in response to a number of failed attempts to log in to the user account, (2) determining that an old version of the credential may be no longer valid for logging in to the user account and that a new version of the credential may be required to log in to the user account, and (3) taking a remedial action that prevents the adverse security action in response to determining that the old version of the credential may be no longer valid.

In one embodiment, the credential may include (1) a password, (2) a username, (3) a challenge-response answer, and/or (4) a type of encryption. In some examples, the user account may include a network directory service account.

The adverse security action may include (1) wiping the computing device and/or (2) locking the user from the user account. In addition, the remedial action may include (1) transmitting a push notification to the computing device to prompt the user to change, at the computing device, the old version of the credential to the new version, (2) transmitting an instruction to the computing device to automatically change, at the computing device, the old version of the credential to the new version, (3) removing a computing device synchronization protocol account that corresponds to the user account from the computing device, and/or (4) reapplying, after removing, the computing device synchronization protocol account from the computing device.

In some examples, determining that the old version of the credential may be no longer valid may include comparing the age of a running credential on a security server with the age of a current credential in the online system. In these examples, comparing the age of the running credential on the security server with the age of the current credential in the online system may include performing, in an operating system task automation framework, a query for the age of the current credential in the online system.

In one embodiment, the computer-implemented method may further include performing, for each of a plurality of users of the online system, in the operating system task automation framework, a query for the age of a current credential for each user of the plurality in the online system. In some examples, determining that the old version of the credential may be no longer valid may include determining that the age of the running credential on the security server may be older than the age of the current credential in the online system.

In one embodiment, the computing device may be configured to save the credential without requiring the user to resubmit the credential upon attempting to log in to the user account. In this embodiment, the security server may be configured to determine whether the computing device may be configured to save the credential without requiring the user to resubmit the credential upon attempting to log in to the user account. In addition, the security server may receive an indication from the computing device that the computing device may be configured to save the credential without requiring the user to resubmit the credential upon attempting to log in to the user account.

In some examples, taking the remedial action that prevents the adverse security action may include preventing the computing device from attempting to log in to the user account using the old version of the credential. In some embodiments, determining that the old version of the credential may be no longer valid may include determining that the user changed the credential from the old version to the new version. In these embodiments, determining that the old version of the credential may be no longer valid may include determining that the user performed an authorized change of the credential from the old version to the new version.

In one embodiment, a system for implementing the above-described method may include (1) an identification module that identifies a credential that a computing device uses to log in to a user account of an online system that is configured to perform an adverse security action in response to a number of failed attempts to log in to the user account, (2) a determination module that may determine that an old version of the credential may be no longer valid for logging in to the user account and that a new version of the credential may be required to log in to the user account, (3) a remediation module that takes a remedial action that prevents the adverse security action in response to determining that the old version of the credential may be no longer valid, and (4) at least one processor configured to execute the identification module, the determination module and the remediation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a credential that a computing device uses to log in to a user account of an online system that is configured to perform an adverse security action in response to a number of failed attempts to log in to the user account, (2) determine that an old version of the credential may be no longer valid for logging in to the user account and that a new version of the credential may be required to log in to the user account, and (3) take a remedial action that prevents the adverse security action in response to determining that the old version of the credential may be no longer valid.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting user accounts. As will be explained in greater detail below, the systems and methods disclosed herein may prevent an adverse security action, such as wiping a computing device or locking out a user from a user account, due to unintentional failed attempts to log in using outdated credentials. As detailed above, computing devices may be configured to automatically try to log in to user accounts using saved credentials (e.g., on an automated schedule or frequency) without requiring a user to resubmit or retype the credentials. In those cases, if the credentials have become outdated, then the automatic attempts may fail. After a number of failed attempts, conventional online systems may take an adverse security action. In contrast, the systems and methods described herein may predict that the adverse security action would otherwise occur (i.e., predict that circumstances that would cause the adverse security action are present) and then take remedial action to prevent the adverse security action.

Figure 1:
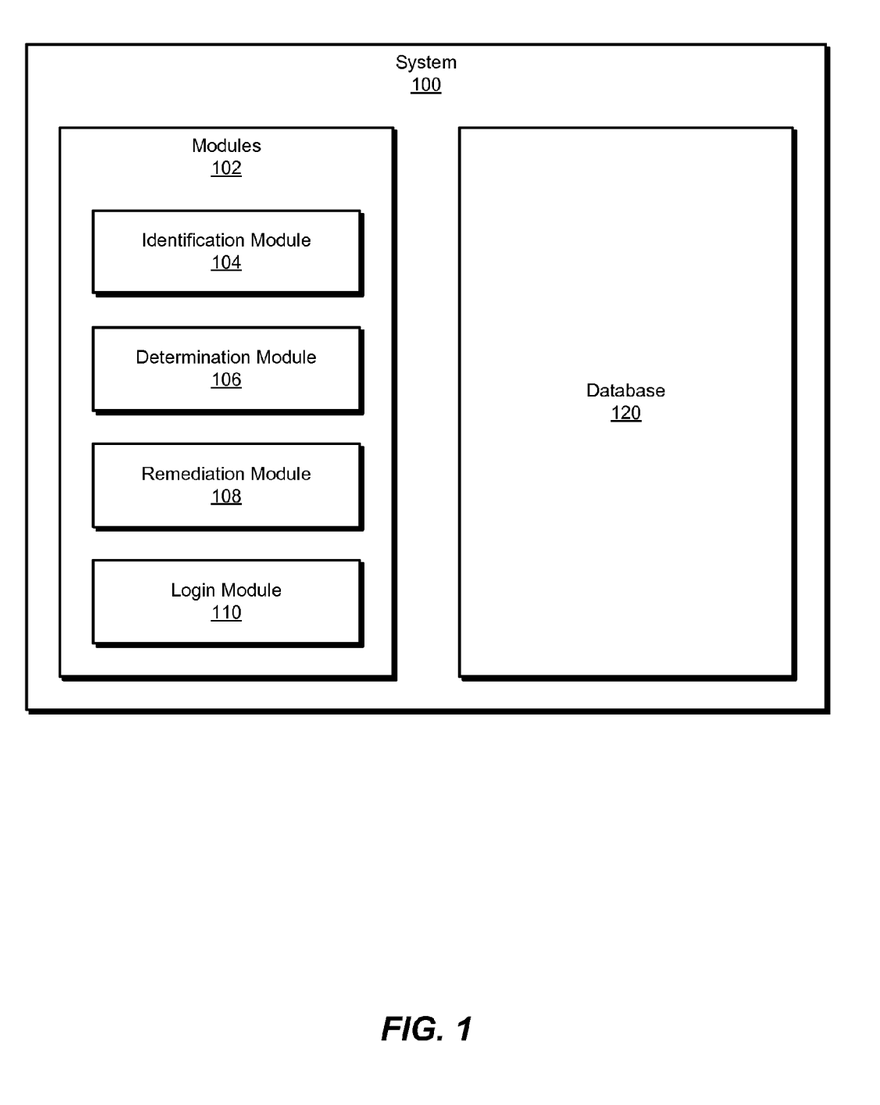
FIG. 1 is a block diagram of an exemplary system for protecting user accounts.
Figure 2:
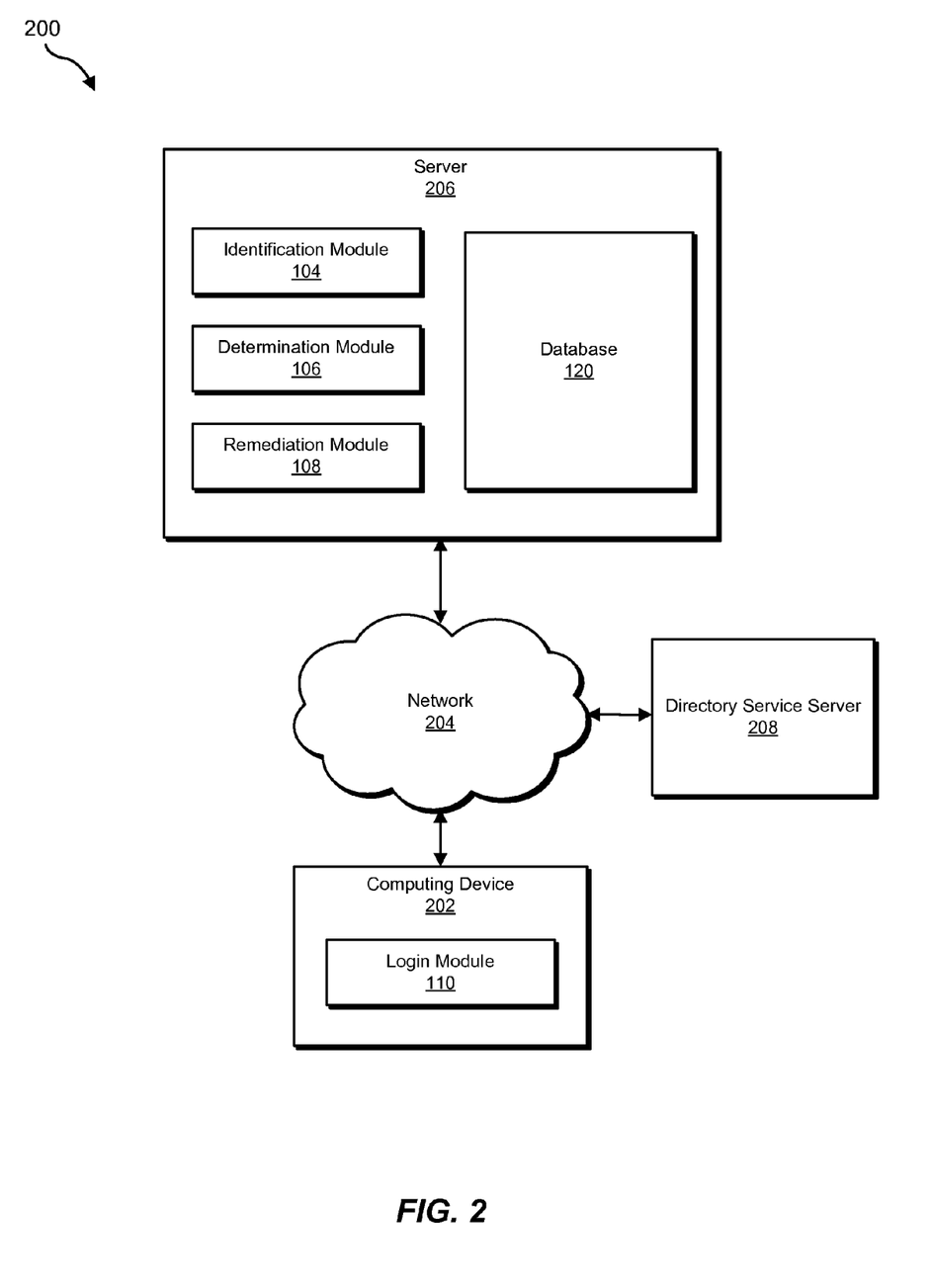
FIG. 2 is a block diagram of an exemplary system for protecting user accounts.

The following will provide, with reference to FIGS. 1-2, detailed descriptions of exemplary systems for protecting user accounts. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for protecting user accounts. As illustrated in this figure, exemplary system 100 may include one or more modules 102 for performing one or more tasks. For example, and as will be explained in greater detail below, exemplary system 100 may also include an identification module 104 that may identify a credential that a computing device uses to log in to a user account of an online system that is configured to perform an adverse security action in response to a number of failed attempts to log in to the user account. Exemplary system 100 may additionally include a determination module 106 that may determine that an old version of the credential may be no longer valid for logging in to the user account and that a new version of the credential may be required to log in to the user account. Exemplary system 100 may also include a remediation module 108 that may take a remedial action that prevents the adverse security action in response to determining that the old version of the credential may be no longer valid. Exemplary system 100 may further include a login module 110 that may attempt to log in to an online system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store information about user accounts and credentials to log in to those user accounts. Accordingly, database 120 may store items of information that include identifiers for users, credentials for logging in to a user's account, and the age for each credential (e.g., the amount of time that has elapsed since the version of the credential was created or set).

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, facilitate computing device 202 and/or server 206 in protecting user accounts. For example, and as will be described in greater detail below, identification module 104 may be programmed to identify a credential that a computing device uses to log in to a user account of an online system that is configured to perform an adverse security action in response to a number of failed attempts to log in to the user account. Determination module 106 may be programmed to determine that an old version of the credential may be no longer valid for logging in to the user account and that a new version of the credential may be required to log in to the user account. Remediation module 108 may be programmed to take a remedial action that prevents the adverse security action in response to determining that the old version of the credential may be no longer valid.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206, which may perform security functions, generally represents any type or form of computing device that is capable of managing or protecting user accounts in an online system. Examples of server 206 include, without limitation, application servers and database servers configured to provide various database services and/or run certain software applications. In one example, server 206 may correspond to a backend server, which may poll for a credential at a directory service server 208, as described below. Server 206 may also manage computing device synchronization protocol accounts that synchronize computing device data with corresponding network directory service accounts through a computing device management protocol.

Directory service server 208 generally represents any type or form of computing device that is capable of providing a network directory service. An example of directory service server 208 includes, without limitation, a server capable of providing ACTIVE DIRECTORY services. In some examples, directory service server 208 may constitute hardware and/or software that parallels server 206. Server 206 and directory service server 208 may also constitute part of the same or different servers. In some examples, login module 110 in computing device 202 may attempt to log in to a user account managed by directory service server 208.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
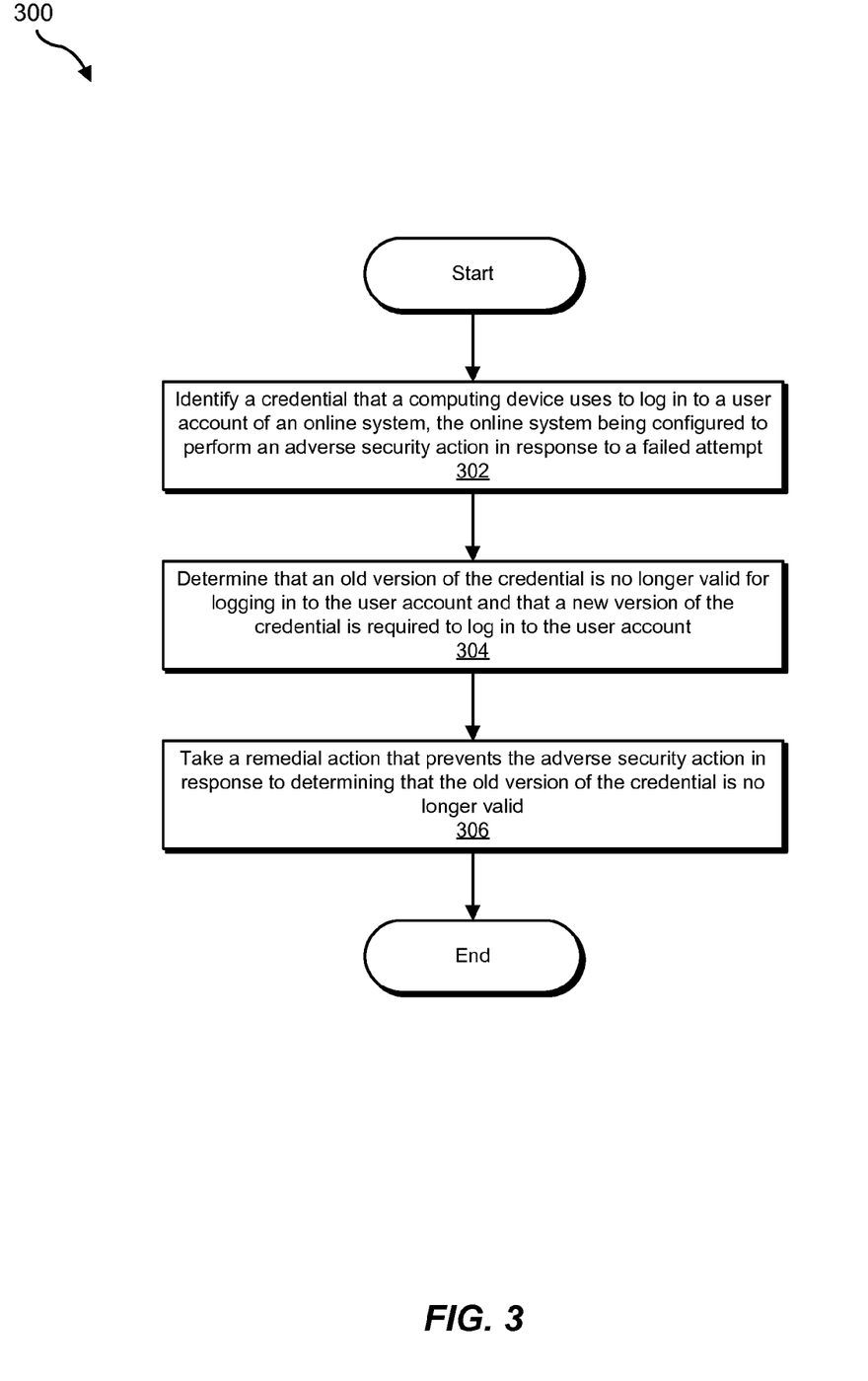
FIG. 3 is a flow diagram of an exemplary method for protecting user accounts.

FIG. 3 is a flow diagram of an exemplary computer-implemented method 300 for protecting user accounts. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a credential that a computing device uses to log in to a user account of an online system that is configured to perform an adverse security action in response to a number of failed attempts to log in to the user account. For example, at step 302 identification module 104 may, as part of server 206 in FIG. 2, identify a credential that a computing device uses to log in to a user account of an online system that is configured to perform an adverse security action in response to a number of failed attempts to log in to the user account.

Identification module 104 may identify the credential in a variety of ways. For example, identification module 104 may receive a request to log in to the user account from the computing device. In this example, the request may contain the credential. Additionally or alternatively, identification module may identify the credential in an internal or backend database, such as database 120. Notably, identification module 104 may identify different versions of the same credential, such as a new version and an old version, as discussed further below. Identification module 104 may also identify the credential as a variable with, or without, further identifying its current content.

The term "credential," as used herein, generally constitutes a property that is used to log in to the user account. For example, a change of the credential to a new version may require requests to log in to the user account to submit or identify (e.g., identify a location of) the new version of the credential. The credential may include a password, a username, a challenge-response answer, and/or a type of encryption. A challenge-response answer may refer to an answer in response to a security system question or prompt, which is intended to verify the authorization of the user answering the question. A type of encryption may indicate a formula or protocol for encryption or a strength of encryption. The credential may also indicate an identifier, including information that identifies a person or account, a communication protocol, metadata (which may identify the age of a property, an authorization status of a property, or a location of a property), a version of software, and/or a version or type of a security protocol.

The term "user account," as used herein, generally represents any account for a user in an online system. In one example, the user account may include a network directory service account. The user account may also include a computing device synchronization protocol account (i.e., one that synchronizes with the network directory service account), such as MICROSOFT EXCHANGE ACTIVESYNC. For example, the user account may include an account on MICROSOFT ACTIVE DIRECTORY, and/or GOOGLE CARDDAV (including IMAP for email, CALDAV for calendars, and CARDDAV for contacts). In general, a computing device synchronization protocol may establish procedures for synchronizing user information between a computing device, such as a mobile device, and other devices.

As detailed above, in some examples the online system may be configured to take an adverse security action in response to a failed number of attempts to log in to the user account. The term "adverse security action," as used herein, generally includes any action adverse to the person making the failed log in attempts to prevent or punish the person for making those failed attempts and/or to protect the user account from unauthorized access. Examples of this adverse security action include wiping the computing device and locking the user from the user account. Wiping the computing device may include wiping all content on the computing device, wiping a proper subset of content on the computing device, and/or wiping the user account on the computing device. The adverse security action may also include locking the user from the computing device, from an online resource, and/or from the online system.

Figure 4:
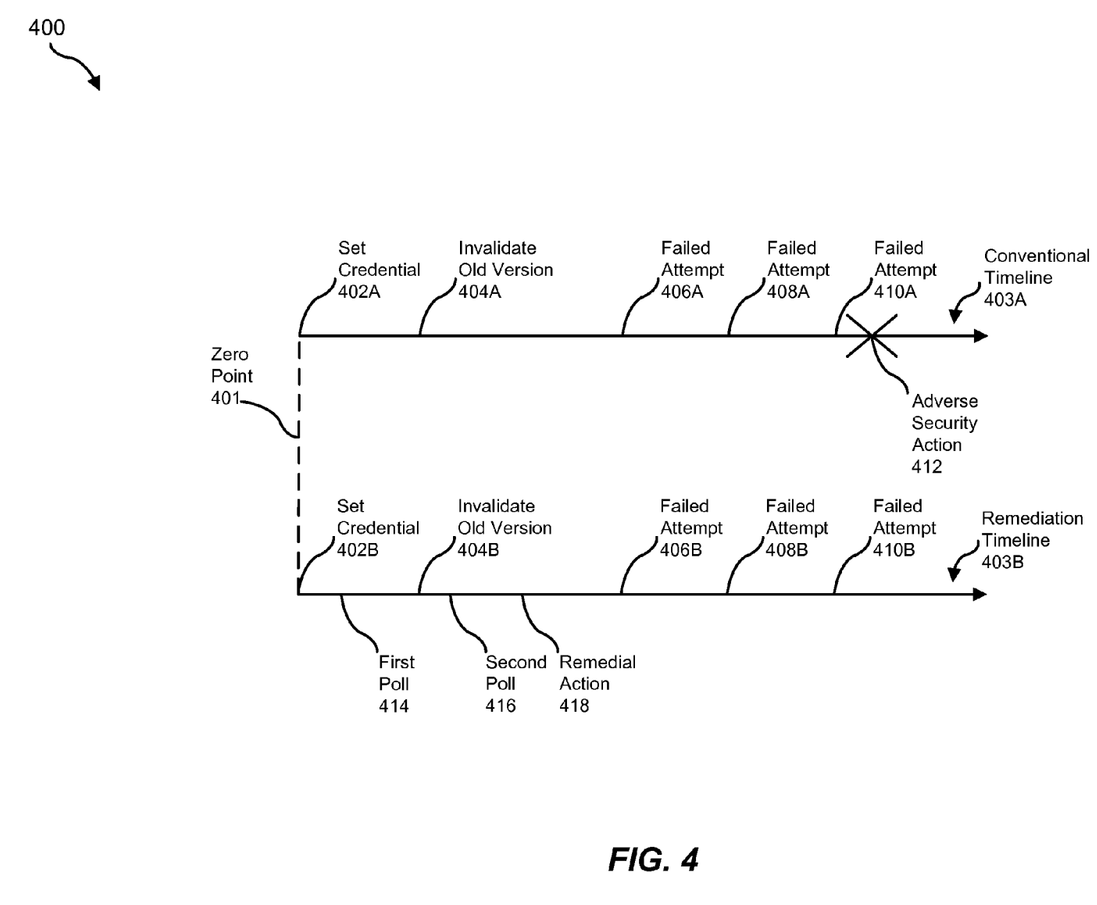
FIG. 4 is a timing diagram of timelines indicating an adverse security action, and preventing an adverse security action, for a user account.

FIG. 4 illustrates both a conventional timeline 403A and a remediation timeline 403B that indicate how to take, or prevent, the adverse security action. Timelines 403A and 403B may share a zero point 401, at which point the timelines begin. In conventional timeline 403A, a credential may be originally (e.g., for the first time) set at step 402A. The credential may be set by the user, by another user, administrator, by an application that the user uses to access the online system, and/or by another application. The credential may be set intentionally or inadvertently in an authorized or unauthorized transaction.

At step 404A, the old version of the credential may be changed or invalidated. In one example, the credential may be invalidated according to a policy that requires a credential change according to an automatic or predetermined schedule or interval in order to make the credential more fresh and secure. The credential may be changed or reset in any of the ways that the credential was originally set at step 402A. The credential may also be autonomously changed, without manual intervention, according to an automatic schedule and/or using a predetermined, random, or pseudorandom formula. The automatic changing, invalidating, resetting, and/or randomizing of the credential may help ensure that the credential is fresh and preserves security. Notably, the old or original version of the credential may be invalidated with or without updating the credential to a new and/or valid version. Moreover, the credential may be changed at another device without updating a stored, saved, or cached copy (i.e., the old or original version) of the credential at the computing device.

In some embodiments, the computing device may be configured to save the credential without requiring the user to resubmit the credential upon attempting to log in to the user account. For example, the computing device may preload the credential (e.g., disguised as asterisks) in a login screen without requiring the user to retype, reclick, or otherwise re-designate the credential.

At steps 406A, 408A, and 410A, the computing device may attempt to log in to the user account using the old or original version of the credential, despite the fact that the old version was invalidated at step 404A. Because the computing device uses the outdated version of the credential, the log in attempts at steps 406A, 408A, and 410A may all fail.

In response to a number of failed log in attempts, the online system may take the adverse security action at step 412. This number of failed attempts may refer to one or more integral and/or partial attempts. In some examples, the number may be predetermined (i.e., determined before a last of the number of attempts triggers the adverse security action, such as by maintaining a running count of failed attempts and only taking the adverse security action when the running count reaches a predetermined threshold value). The number may also be not predetermined, randomized, and/or manually verified (e.g., by prompting an administrator upon one or more failed attempts about whether to take the adverse security action).

In some embodiments, server 206 may be configured to determine whether the computing device is configured to save the credential without requiring the user to resubmit the credential upon attempting to log in to the user account. For example, server 206 may receive an indication from the computing device that the computing device is configured to save the credential without requiring the user to resubmit the credential upon attempting to log in to the user account.

In some examples, determination module 106 at server 206 may determine that the computing device is configured to save the credential by polling the computing device. Determination module 106 may receive information identifying hardware and/or software, and/or settings of hardware and/or software, indicating that the computing device is configured to save the credential without requiring the user to resubmit. Determination module 106 may also receive the identifying information in response to a poll or prompt. Alternatively, determination module 106 may receive the identifying information automatically from a security agent on the computing device. Having received the identifying information, determination module 106 may determine that the computing device is configured to save the credential without requiring the user to resubmit by looking up hardware, software, and/or settings of the computing device in a database that matches hardware, software, and/or settings with indications of whether a corresponding computing device would save the credential without requiring the user to resubmit.

Returning to FIG. 3, at step 304 one or more of the systems described herein may determine that an old version of the credential is no longer valid for logging in to the user account and that a new version of the credential is required to log in to the user account. For example, at step 304 determination module 106 may, as part of server 206 in FIG. 2, determine that an old version of the credential is no longer valid for logging in to the user account and that a new version of the credential is required to log in to the user account.

Determination module 106 may determine that an old version of the credential is no longer valid for logging in to the user account in a variety of ways. For example, determination module 106 may determine that a predetermined time has arrived for invalidating the old version of the credential. Determination module 106 may also poll a network directory service server, like server 208, to determine whether the old version has been invalidated or expired. Determination module 106 may then attempt to log in using the old version of the credential, and determine that the attempt failed. In addition, determination module 106 may also determine that the content of a current and/or polled credential (e.g., from directory service server 208) does not match the content of a running or previously stored credential (e.g., on server 206). Determination module 106 may also determine that the age of the current credential is shorter (e.g., that the current credential is newer) than the age of the running credential, as further described below.

Returning to FIG. 4, remediation timeline 403B may, like conventional timeline 403A, include corresponding steps of originally setting the credential (step 402B) and invalidating the old version of the credential (step 404B). In general, steps in one timeline may correspond to analogous steps in the other timeline having the same number with the opposite A or B suffix. In contrast to conventional timeline 403A, however, remediation timeline 403B may further include a first poll step 414 and a second poll step 416. At each poll step, determination module 106 may determine a current version of the credential in the online system. Thus, at first poll step 414, determination module 106 may determine that the current version of the credential is the original version of the credential set at step 402B. Similarly, at second poll step 416, determination module 106 may determine that the current version of the credential is the new version of the credential set at step 404B. In addition to, or alternative to, polling for the content of the credential, determination module 106 may poll for the age of the credential. For example, determination module 106 may perform, in an operating system task automation framework, a query for the age of the current credential in the online system. The operating system task automation framework may include MICROSOFT WINDOWS POWERSHELL or any suitable framework for automating tasks or procedures within an operating system.

Figure 5:
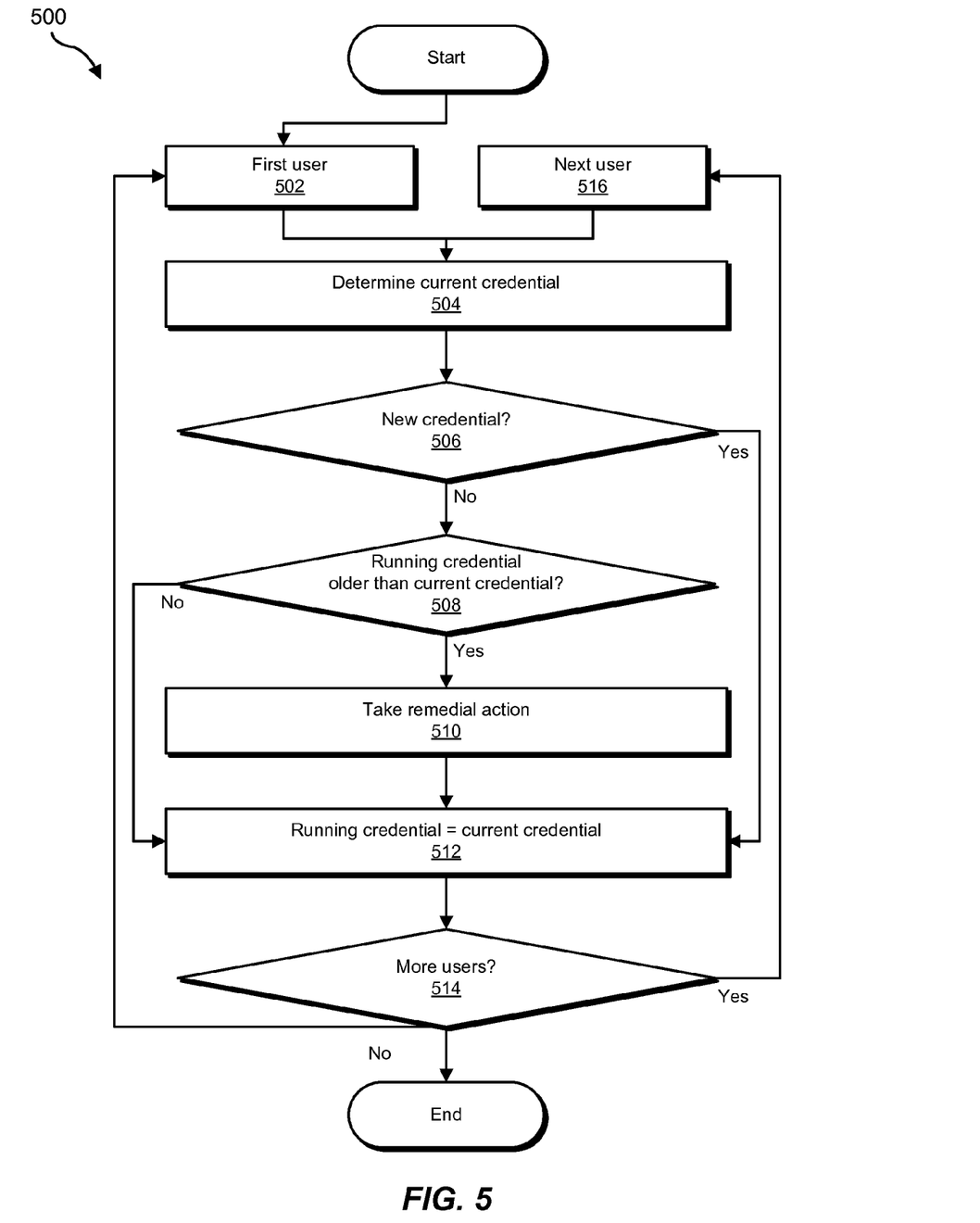
FIG. 5 is a flow diagram of an exemplary method for protecting user accounts.

Determination module 106 may determine that the old version of the credential is no longer valid by comparing the age of a running credential on a server, such as security 206, with the age of the current credential in the online system (e.g., as indicated by the network directory service on directory service server 208). FIG. 5 shows a flow diagram 500, which indicates an exemplary method for comparing the running credential and the current credential. At step 502, determination module 106 may determine a first user from among a plurality of users having user accounts to protect or configured for protection. At step 504, determination module 106 may determine a current version of the credential. For example, determination module 106 may perform a POWERSHELL query, as discussed above. Determination module 106 may also poll the computing device or another device configured to access, or attempt to access, the user account. At decision 506, determination module 106 may determine whether the current version of the credential indicates a newly identified credential (i.e., whether a version or copy of the credential has been previously encountered). If the current version of the credential indicates a newly encountered credential, then one may presume that the new credential has not been changed, and method 500 may proceed to storing the current version of the credential as a running credential at step 512.

Alternatively, if the current version of the credential does not indicate a newly encountered credential, then method 500 may proceed to decision 508. At that decision, determination module 106 may determine whether the running credential is older than the current credential. As used herein, the term "older" may refer to both "strictly older" and "older or equal to." Determination module 106 may determine that the old version of the credential is no longer valid by determining that the age of the running credential on a security server is older than the age of the current credential in the online system. The age of a version of the credential may refer to a magnitude of time occurring between the creation or setting of that version of the credential and a polling of the credential's age.

Determination module 106 may also determine that the old version of the credential is no longer valid by determining that the user changed the credential from the old version to the new version. Determination module 106 may also determine that the user performed an authorized change of the credential from the old version to the new version. In other words, determination module 106 may distinguish between computing devices that automatically resubmit old versions of credentials, without requiring a user to retype or re-designate them, which may benefit from systems and methods described herein, and computing devices that are not so configured, and therefore may not benefit. Determination module 106 may also distinguish between authorized and unauthorized changes of the credential (or invalidations of the old version of the credential). Remediation module 108 may only prevent the adverse security action in response to an authorized change of the credential or an authorized invalidation of the old version of the credential.

If determination module 106 determines at decision 508 that the running credential is older than the current credential, then remediation module 108 may take remedial action at step 510, which may correspond to step 306 of FIG. 3, as further discussed below. If determination module 106 determines at decision 508 that the running credential is not older, then method 500 may skip the taking of remedial action at step 510. Regardless of how decisions 506 and 508 are decided, the running credential (and/or corresponding age) may be updated to reflect the current credential (and/or corresponding age) at step 512.

Notably, the systems and methods descried herein may protect multiple users within a same, or different, online system. Accordingly, determination module 106 may perform, for each of a plurality of users of the online system, in an operating system task automation framework, a query for the age of a current credential for each user of the plurality in the online system. Thus, near the end of method 500, determination module 106 may determine, at decision 514, whether more users are configured for protection from the adverse security action. If so, method 500 may effectively repeat, beginning at step 516 with a new user. Alternatively, if there are no more users, method 500 may repeat with the same user at step 502. Method 500 may repeat indefinitely while one or more users are protected. Alternatively, if determination module 106 determines that there are no more users at decision 514, and/or if protection is disabled, then method 500 may end.

The systems and methods described herein may also perform method 500 and/or a proper subset of its steps (e.g., one or more instances of polling and/or decisions) at a fixed or dynamic interval. Between any two executions of the polling, decisions, and/or method, the fixed or dynamic interval may be shorter (e.g., set shorter by determination module 106) than the age of the running credential to ensure that decision 508 does not produce a false negative upon next executing decision 508.

Returning to FIG. 3, at step 306 one or more of the systems described herein may take a remedial action that prevents the adverse security action in response to determining that the old version of the credential is no longer valid. For example, at step 306 remediation module 108 may, as part of server 206 in FIG. 2, take a remedial action that prevents the adverse security action in response to determining that the old version of the credential is no longer valid.

Remediation module 108 may take remedial action in a variety of ways. The remedial action may include transmitting a push notification to the computing device to prompt the user to change, at the computing device, the old version of the credential to the new version. The remedial action may also include transmitting an instruction to the computing device to automatically change, at the computing device, the old version of the credential to the new version. Additionally, or alternatively, the remedial action may include removing a computing device synchronization protocol account that corresponds to the user account from the computing device. In this example, the computing device synchronization protocol account may synchronize the user account between the computing device and the online system. After removing the computing device synchronization protocol account from the computing device, remediation module 108 may also reapply the computing device synchronization protocol account that was removed from the computing device.

Remediation module 108 may also prevent the adverse security action by preventing the computing device from attempting to log in to the user account using the old version of the credential. Alternatively, remediation module 108 may permit the computing device to attempt to log in to the user account using the old version of the credential, but simply refrain from (or inhibit) the adverse security reaction. Remediation module 108 may also allow the attempt to log in using the old version of the credential to succeed.

The systems and methods described herein are capable of monitoring ACTIVE DIRECTORY, or another network directory service, for credential changes or invalidations, and using that information to prevent the unintended wiping of computing devices and/or lockout of an ACTIVE DIRECTORY account, or other adverse security action. In one embodiment, this is accomplished by automatically removing and reapplying the EXCHANGE ACTIVESYNC account(s) associated with the affected ACTIVE DIRECTORY credentials (for example, username and password) on a computing device.

As described above, it is possible for a user to have their computing device unintentionally wiped or be locked out of their ACTIVE DIRECTORY account when they are forced to change their account credential. This is because their computing device will continue to try retrieving email or other information with the old version of their credential until its user goes into the computing device's settings and inputs a newly required credential. In one embodiment, the systems and methods described herein may provide a solution by monitoring ACTIVE DIRECTORY for account credential changes and automatically removing and reapplying EXCHANGE ACTIVESYNC policies on computing devices tied to accounts whose account credential have been changed or invalidated.

The following components may be helpful for the systems and methods described herein: 1. a MICROSOFT EXCHANGE SERVER or other email, calendar, and/or contact server, 2. a WINDOWS SERVER or other server running ACTIVE DIRECTORY or other network directory service, 3. a computing device that allows EXCHANGE ACTIVESYNC, or other computing synchronization protocol accounts, to be managed by a backend server (examples include devices running iOS, WINDOWS MOBILE, WINDOWS PHONE 8, and WINDOWS RT), 4. a backend server containing a service that queries ACTIVE DIRECTORY or other network directory services for password or credential changes and the ability to manage EXCHANGE ACTIVESYNC or other synchronization protocol accounts on computing devices.

The first component that may be helpful is a MICROSOFT EXCHANGE or other email/calendar/contact server. This server may be used to provide corporate email service to an enterprise.

The second component that may be helpful is a WINDOWS SERVER, or other server, running the ACTIVE DIRECTORY or other network directory service. This service may be configured to allow WINDOWS POWERSHELL queries against ACTIVE DIRECTORY user accounts.

The third component that may be helpful is a computing device that allows EXCHANCE ACTIVESYNC accounts, or other computing device synchronization protocol accounts, to be managed by a backend server. For example, iOS devices may allow this management through the APPLE MOBILE DEVICE MANAGEMENT protocol, while WINDOWS PHONE 8 devices may allow this management through the OPEN MOBILE ALLIANCE—DEVICE MANAGEMENT protocol. The computing device may be enrolled with the backend server and may have its EXCHANGE ACTIVESYNC accounts managed by the backend server as well.

The fourth component that may be helpful is a backend server. This backend server may benefit from a service that polls ACTIVE DIRECTORY for password or other credential changes or invalidations (referred to as the "AD Polling Service") and the ability to manage EXCHANGE ACTIVESYNC accounts on the computing device through MOBILE DEVICE MANAGEMENT (referred to simply as "MDM"). The AD Polling Service may run a POWERSHELL query against ACTIVE DIRECTORY on an interval, asking ACTIVE DIRECTORY for the current password age of each user. For each user, if this is the first time the current password age has been retrieved, the backend server may simply store the value for later. If this is not the first time the current password age has been retrieved, the backend server may compare the value against what was stored previously. If the new value is greater than the old value, the new value may be stored for later and nothing else may happen. If the new value is less than the old value, the new value may be stored for later and the AD Polling Service may notify MDM to remove and reapply all EXCHANGE ACTIVESYNC accounts for that user on all computing devices. For example, if a single user had their EXCHANGE ACTIVESYNC account on their iPHONE and iPAD, it would be removed and reapplied on both. The action of removing and reapplying the EXCHANGE ACTIVESYNC account may stop the computing device from using the existing password or credential and may force the user to re-enter their new credential, thus preventing the adverse security action, such as the unintended wipe of the device(s). The remedial action may also prevent the user from being locked out of their ACTIVE DIRECTORY account.

Figure 6:
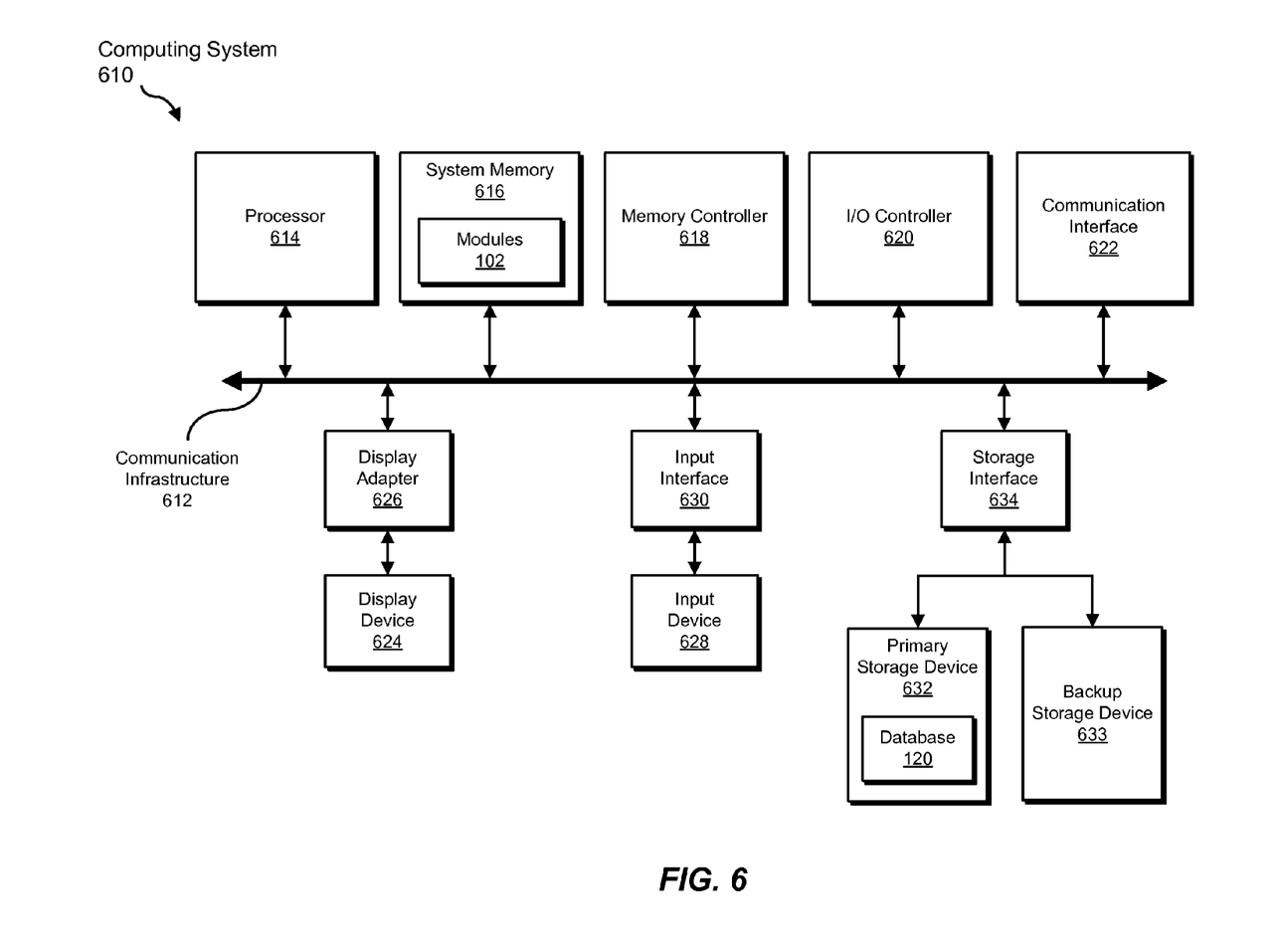
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor

614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
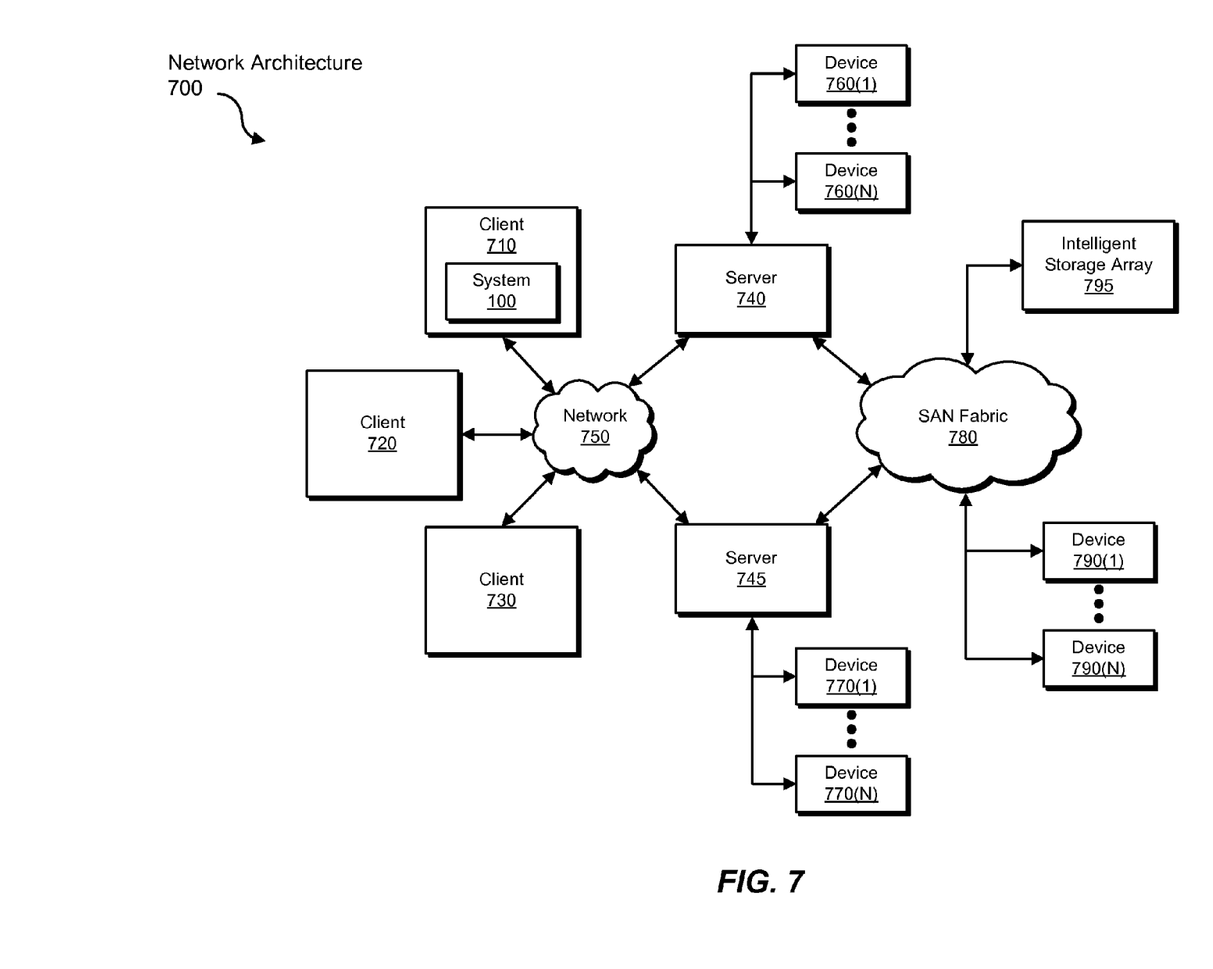
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for protecting user accounts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may identify a reaction to a failed attempt to log in to an online system, transform the reaction from an adverse security action to a non-adverse security action, or otherwise take remedial action, output a result of the transformation or remedial action to prevent the adverse security action, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting user accounts, at least a portion of the method being performed by a computing device comprising at least one processor, the method comprising:
    identifying a credential that a client device uses to log in to a user account of an online system, where the online system is configured to perform an adverse security action in response to a number of failed attempts to log in to the user account;
    determining that an old version of the credential is no longer valid for logging in to the user account and that a new version of the credential is required to log in to the user account;
    taking, by the computing device, a remedial action that prevents the adverse security action in response to determining that the old version of the credential is no longer valid, wherein taking the remedial action that prevents the adverse security action comprises preventing, by the computing device, the client device from attempting to log in to the user account using the old version of the credential.

2. The computer-implemented method of claim 1, wherein the credential comprises at least one of:
    a password;
    a username;
    a challenge-response answer;
    a type of encryption.

3. The computer-implemented method of claim 1, wherein the user account comprises a network directory service account.

4. The computer-implemented method of claim 1, wherein the adverse security action comprises at least one of:
    wiping the client device;
    locking the user from the user account.

5. The computer-implemented method of claim 1, wherein the remedial action comprises at least one of:
    transmitting a push notification to the client device to prompt the user to change, at the client device, the old version of the credential to the new version;
    transmitting an instruction to the client device to automatically change, at the client device, the old version of the credential to the new version;
    removing a computing device synchronization protocol account that corresponds to the user account from the client device; and
    reapplying, after removing, the computing device synchronization protocol account from the client device.

6. The computer-implemented method of claim 1, wherein determining that the old version of the credential is no longer valid comprises comparing an age of a running credential on a security server with an age of a current credential in the online system.

7. The computer-implemented method of claim 6, wherein comparing the age of the running credential on the security server with the age of the current credential in the online system comprises performing, in an operating system task automation framework, a query for the age of the current credential in the online system.

8. The computer-implemented method of claim 7, further comprising performing, for each of a plurality of users of the online system, in the operating system task automation framework, a query for the age of a current credential for each user of the plurality of users of the online system.

9. The computer-implemented method of claim 6, wherein determining that the old version of the credential is no longer valid comprises determining that the age of the running credential on the security server is older than the age of the current credential in the online system.

10. The computer-implemented method of claim 1, wherein the client device is configured to save the credential without requiring the user to resubmit the credential upon attempting to log in to the user account.

11. The computer-implemented method of claim 10, wherein the computing device is configured to determine whether the client device is configured to save the credential without requiring the user to resubmit the credential upon attempting to log in to the user account.

12. The computer-implemented method of claim 11, wherein the computing device receives an indication from the client device that the client device is configured to save the credential without requiring the user to resubmit the credential upon attempting to log in to the user account.

13. The computer-implemented method of claim 1, wherein determining that the old version of the credential is no longer valid comprises determining that the user changed the credential from the old version to the new version.

14. The computer-implemented method of claim 13, wherein determining that the old version of the credential is no longer valid comprises determining that the user performed an authorized change of the credential from the old version to the new version.

15. A system for protecting user accounts, the system comprising:
    an identification module that identifies a credential that a client device uses to log in to a user account of an online system, where the online system is configured to perform an adverse security action in response to a number of failed attempts to log in to the user account;
    a determination module that determines that an old version of the credential is no longer valid for logging in to the user account and that a new version of the credential is required to log in to the user account;
    a remediation module that takes a remedial action that prevents the adverse security action in response to determining that the old version of the credential is no longer valid, wherein taking the remedial action that prevents the adverse security action comprises preventing, by the system for protecting user accounts, the client device from attempting to log in to the user account using the old version of the credential;

at least one hardware processor configured to execute the identification module, the determination module and the remediation module.

16. The system of claim 15, wherein the credential comprises at least one of:
   a password;
   a username;
   a challenge-response answer;
   a type of encryption.

17. The system of claim 15, wherein the user account comprises a network directory service account.

18. The system of claim 15, wherein the adverse security action comprises at least one of:
   wiping the client device;
   locking the user from the user account.

19. A non-transitory computer-readable-storage medium comprising one or more computer-readable instructions that, when executed by at least one processor of a computing device, cause the computing device to:
   identify a credential that a client device uses to log in to a user account of an online system, where the online system is configured to perform an adverse security action in response to a number of failed attempts to log in to the user account;
   determine that an old version of the credential is no longer valid for logging in to the user account and that a new version of the credential is required to log in to the user account;
   take a remedial action that prevents the adverse security action in response to determining that the old version of the credential is no longer valid, wherein taking the remedial action that prevents the adverse security action comprises preventing, by the computing device, the client device from attempting to log in to the user account using the old version of the credential.

* * * * *